US006843649B2

United States Patent
Hart et al.

(12) United States Patent
(10) Patent No.: US 6,843,649 B2
(45) Date of Patent: Jan. 18, 2005

(54) BURNER

(75) Inventors: Edward Hart, Leeds (GB); Dennis Lewis, Leeds (GB)

(73) Assignee: Bray Burners Limited, Leeds (GB)

(*) Notice: Subject to any disclaimer, the term of this patent is extended or adjusted under 35 U.S.C. 154(b) by 0 days.

(21) Appl. No.: 10/444,331

(22) Filed: May 23, 2003

(65) Prior Publication Data
US 2004/0033461 A1 Feb. 19, 2004

(51) Int. Cl.[7] ............................................. F23Q 2/32
(52) U.S. Cl. .................................... 431/126; 431/329
(58) Field of Search ............................ 431/126, 328, 431/329

(56) References Cited

U.S. PATENT DOCUMENTS

| | | | | |
|---|---|---|---|---|
| 975,859 A | * | 11/1910 | Hackmann | 431/126 |
| 3,547,097 A | * | 12/1970 | Rice et al. | 126/4 |
| 4,886,044 A | | 12/1989 | Best | |
| 4,952,492 A | * | 8/1990 | Clark et al. | 431/89 |
| 4,976,609 A | * | 12/1990 | Grob et al. | 126/373.1 |
| 5,989,013 A | * | 11/1999 | Gray | 431/326 |
| 6,190,162 B1 | * | 2/2001 | Smith et al. | 431/328 |
| 2001/0036610 A1 | * | 11/2001 | Wood | 431/328 |

FOREIGN PATENT DOCUMENTS

| | | |
|---|---|---|
| EP | 1010940 | 11/1999 |
| GB | 1446331 | 2/1973 |

* cited by examiner

*Primary Examiner*—Alfred Basichas
(74) *Attorney, Agent, or Firm*—James W. Kayden; Thomas, Kayden, Horstemeyer & Risley, LLP

(57) ABSTRACT

The invention which is the subject of this application relates to a burner of the type which can be used as part of cooking apparatus, heating apparatus or the like. The burner includes a plenum chamber and a combustion surface comprising an outer layer of heat resistant material and at least one inner layer of gauze or gauze like material. The gauze like material incandesces when lit and is viewable through apertures in the outer layer. The apertures are grouped and shaped to define at least one alphanumeric character and/or design logo which when is viewable when the burner is lit.

18 Claims, 4 Drawing Sheets

BURNER

CLAIM OF PRIORITY OF FOREIGN APPICATION

This application claims priority to British Patent Application No. GB 0212070.7 filed May 25, 2002, entitled Improved Burner.

This invention relates to an improved burner, and more specifically to a burner which is adapted for use, for example as a burner in a barbeque appliance wherein the burner head is disposed with its flame strip facing downwardly above a metal grille on which the food to be cooked thereby is placed, or alternatively as a heater burner such as for example for a patio heater assembly.

Although the following description is provided with almost exclusive reference to the burner in use as a barbeque grill, it will be appreciated by those skilled in the art that the burners hereinafter described can have wider application than being adapted solely for use in barbeque appliances, and indeed it is envisaged by the applicants that a burner according to this invention may be used in any type of appliance where a burner head to provide heat is required. Accordingly, this invention is not to be considered as limited to the particular use of the burner head and additionally the invention is not to be considered as limited by the orientation of the burner head, although it will be appreciated from the following description that the invention is best suited when the burner flame strip is visible or can be orientated so as to be visible during the use of the appliance in a particular manner.

The prior art document U.S. Pat. No. 4,886,044 to Best describes a barbeque appliance in which the burner of the present invention may be ideally adapted for use. This document describes a hollow upright cabinet which supports a cooking grille beneath which a plurality of upwardly facing gas burners are disposed so as to radiate heat upwardly towards said grille to cook food disposed thereon. A shield assembly having angled baffles is removably mounted over and above the burners to shield the food on the grille directly above the burners from the infra red radiation emitted from the burner flames and flamestrip and the baffles of said shield assembly further serve to prevent the dripping of fats directly onto the burner faces. The spacing of the baffles does allow some of the infra red radiation to pass upwardly, and additionally permits convected heat to rise upwardly towards the grille and food thereon, albeit at an angle. In the patent, the burner elements are described as being fabricated from a ceramic material, and accordingly the facility for burner turn down is accordingly limited. Burner turn down is the term used to describe the ability of a burner to operate effectively as the supply of gas and air to its combustion surface is gradually or rapidly reduced. In general, it is well known that the ability of ceramic burner plaques which are provided with a generally uniform pattern of flame ports therethrough do not have any significant capacity for being modulated so as to operate under conditions of reduced gas/air flow, and accordingly, it can be argued that these types of burners are inappropriate for barbeque appliances or cooking appliances in general where the ability to cook foods with varying degrees of rapidity and heat is a required feature.

GB1446331 in the name of Valor Heating desribes a burner which comprises a casing being a metal pressing defining a generally annular cavity over which is disposed an annular sheet steel spreader element and which is provided with a continuous aperture to allow the combustible gas/air mixture therethrough. To complete the burner head construction, an annular screen is disposed over the spreader element and mounted to the casing by means of peening the annular edges of the casing over the edges of the spreader element and the screen. The shape of the aperture of the spreader element is generally symmetrical and chosen such that the screen, which is a metal gauze or the like, is heated during operation of the burner to provide a uniform incandescence over its entire surface area, even in the regions superimposed on the lands between the regions of the spreader element in which the aperture is provided.

In the applicant's own patent application EP1010940, an atmospheric burner construction is described wherein a steel or aluminium pressing has brazed thereto a gas feed pipe through which combustible gas flows into the plenum chamber of the burner defined by the cavity in the pressing. The gas flows substantially evenly beneath two perpendicularly orientated sheets of gauze and a punched hardened steel sheet which is disposed immediately in front of the gauze sheets and secured to the steel or aluminium pressing around its edges so that combustion only occurs in the region of the apertures which are punched from said steel sheet, and the gauze immediately behind said apertures incandesces only in the region of said apertures. The arrangement of the punched apertures in said hardened steel sheet is chosen so that a substantially even heat distribution across the surface is achieved.

It is a primary object of this invention to provide an advance on the basic atmospheric burners described above and particularly to improve their utility while maintaining or indeed improving their performance.

According to the present invention there is provided a burner having a plenum chamber into which a source of combustible gas may be fed through an inlet thereof, said plenum chamber defining a cavity being a generally planar combustion surface of said burner, said combustion surface being formed firstly of a sheet of metal or other material capable of resisting heat provided with a plurality of apertures therein through which the combustible gas may pass to combust on or proximate the surface of said sheet of metal in the region of said apertures, and secondly of one or more sheets of permeable gauze-like material disposed immediately behind said sheet of metal or other material within the plenum chamber of said burner, said permeable gauze-like material incandescing in the presence of the heat of combustion and characterised in that the apertures within said sheet of metal or other material are arranged in a pattern which both ensures a generally uniform distribution of heat across the combustion surface during operation and which provides a visual display during operation by virtue of the incandescence of the permeable gauze like material viewable through the said apertures.

Preferably, the sheet of metal is provided with a hardening coating which renders said combustion surface substantially black, the incandescence of the permeable gauze-like material therebehind being thus highlighted as it is viewable through the apertures to clearly define the visual display defined by the apertures.

In one embodiment the apertures provided in the sheet of metal which substantially forms the combustion surface are predominantly in the form of discreet slots arranged adjacent one another to define alphanumeric characters, and most preferably the informational message display during operation is the name of the manufacturer of the appliance, the burner or the like.

The permeable gauze-like material can be a metal gauze or mesh, and most preferably two sheets of metal gauze, one orientated perpendicularly to the other as regards the warp and weft of the weave of the gauze are employed.

Most preferably the sheet steel combustion surface is heat treated to render it resistant to heat, said treatment resulting in a blackening of at least one surface of said sheet, said blackened surface being disposed outwardly of said burner so as to act as the combustion surface.

It is yet further preferable that the burner of the present invention forms part of a cooking apparatus which permits the burner head to be rotated so as to reveal its combustion surface and thus display the informational message.

It is still further preferable that each alphanumeric character defined in the combustion surface sheet consists of a plurality of separate apertures adjacently arranged in the shape of that particular alphanumeric character.

The present invention thus provides an immediate enhancement to existing burner appliances in that the name of the manufacturer may be displayed continuously during the operation of the burner. The realisation that the apertures within the perforated sheet which acts as the combustion surface may be arranged to spell out a word or display a character results from the realisation that the incandescence of the gauze or mesh portions coincident with the apertures in the combustion surface sheet is very much like a conventional Light Emitting Diode display wherein the contrast between the light emitting elements and the background is such that the alphanumeric characters display are instantly recognisable and discernible when operating. In the burner of the present invention, not only does the burner operate with excellent turn down characteristics (on account of it atmospheric operation and general construction), but the burner also provides an additional function in that a message may be displayed during use, for example an advertising or manufacturers message.

It is further to be mentioned that the informational message is only clearly discernible when the burner is operating as it is only during such times that the apertures in the combustion surface sheet are perceived as being illuminated by virtue of the incandescence of the gauze-like material immediately therebehind. When the burner is extinguished, the gauze-like material portions coincident with the apertures are generally dark in colour and are difficult to discern from the blackened combustion surface sheet.

In one embodiment the burner can be oriented with respect to the remaining apparatus with which the same is provided to allow the outer surface and apertures thereon to be viewable in use. In one embodiment the burner is provided with a connection to the apparatus, the angular disposition of which can be adjusted in at least one axis. The connection can be a series of interconnected members which are respectively pivotal or alternatively a flexible member which can be manually adjusted.

The apparatus into which the burners are fitted can be heating or cooking appliances and said appliances may incorporate a number of said burners.

Specific embodiments of the invention are now described by way of example with reference to the accompanying drawings wherein FIG. 1-2 shows an exploded perspective view of a burner according to the present invention.

Figure 1:
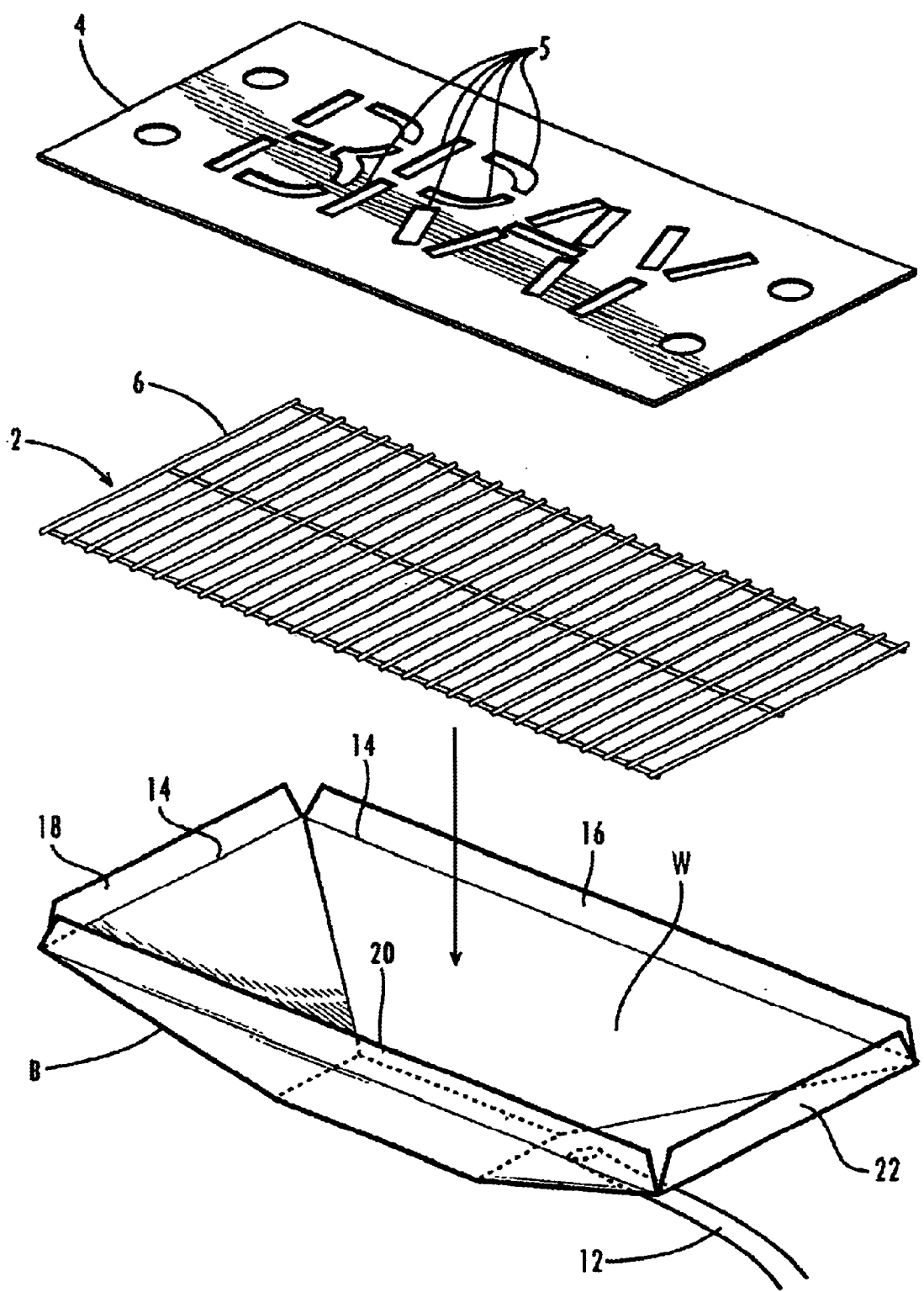
Figure 2:
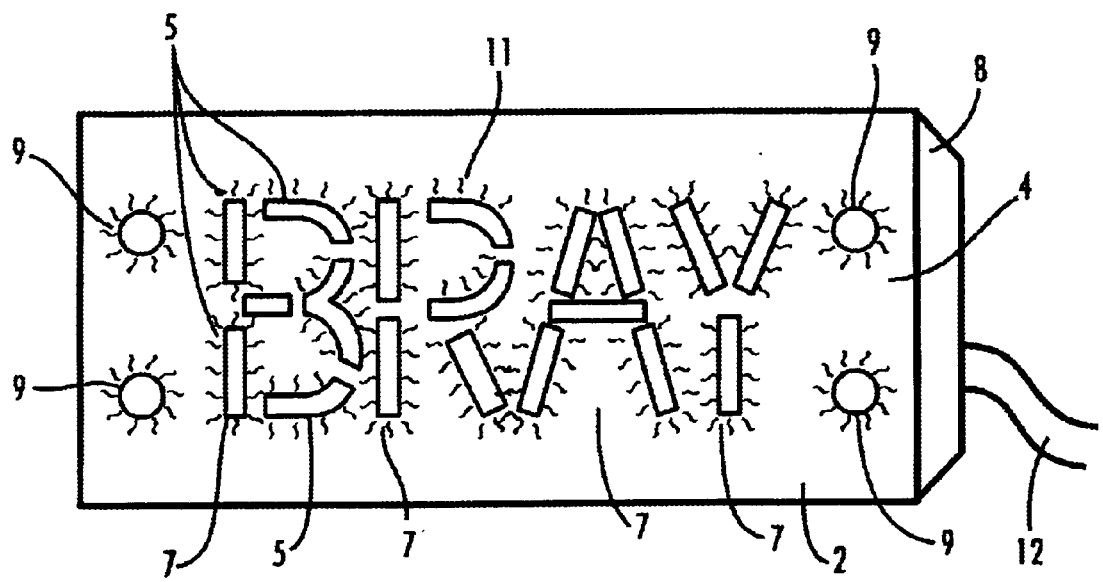

Referring firstly to FIGS. 1 and 2 there is shown a burner 2 consisting of an apertured sheet of metal 4 which overlies a permeable metal gauze layer 6 in the final burner construction, and both of these sheets are mounted in a plenum chamber 8 which is in the form of a metal pressing and which defines a cavity 10 which is fed with a supply of combustible gas through an inlet pipe 12 brazed to the rear of the pressing. The apertured sheet 4 is provided with a plurality of sets 7 of aperture elements 5 which together are shaped and arranged so as to define an alphanumeric character. Several sets 7 of such apertured elements are provided in the sheet 4 to define a plurality of alphanumeric characters, and in this instance, these sets together define a word "BRAY", or may be a manufacturer name or other advertising slogan, character, or device. Additional apertures 9 can be provided to ensure that the heating performance of the burner is maintained.

The burner construction is completed by disposing the sheets 4, 6 on a lip 14 defined around the internal peripheral region of the plenum chamber so that they are seated thereon, and thereafter deforming flanges 16, 18, 20, 22 over the edge regions of the sheet 4 thus clamping both sheets 4, 6 securely and in generally air-tight manner around their edges.

Importantly, the gauze sheet 6 is of a metal or other substance which incandescence when combustion occurs thereon or adjacent thereto so as to give the appearance of illumination of the various apertured elements 5 in the combustion surface sheet 4.

In use, the combustion gas passes from the plenum chamber 8 through the permeable gauze sheet 6 and ultimately through the apertured elements 5 in the sheet 4. In the case of a pre-mix burner, the gas will have been pre-mixed with air to a certain degree and may therefore be capable of combusting without the need for ambient air, but in any event, the combustion occurs on the surface of the sheet 4 in the ambient air, and most particularly immediately adjacent the aperture elements of the sheet 4. Ideally said aperture elements are arranged so that the heat of combustion is radiated away from the surface of sheet 4 generally uniformly, and furthermore combustion does in fact occur over the roughly entire surface of the sheet 4. It is only by virtue of the aperture elements that this combustion causes regions of the metal gauze sheet 6 to incandesce and thus to give the appearance of illumination 11 of the aperture elements which contributes to the display effect and enables the informational message, in this case "BRAY" to be clearly discerned as is illustrated in FIG. 2.

Figure 3:
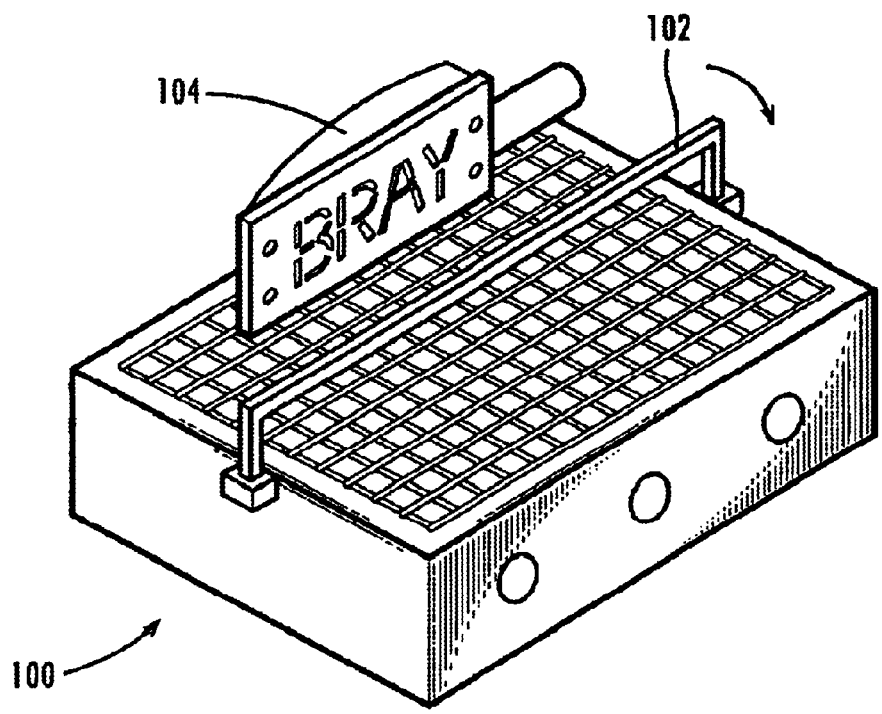
FIGS. 3-4 show a further embodiment of the invention as part of a rotisserie.
Figure 4:
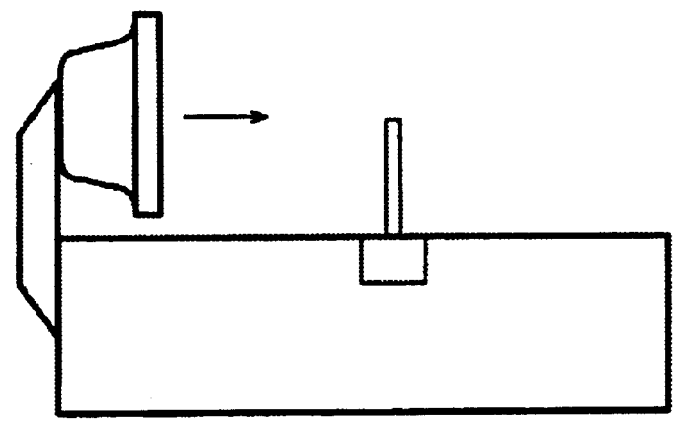

Referring to FIGS. 3-4, there is shown a rotisserie-style appliance 100 for roasting meats in rotary fashion mounted on a spit 102 behind which is mounted a burner 104 in accordance with this invention. A side elevation of the appliance 100 is shown in FIG. 4. Again it is seen how the display utilising the alphanumeric apertures can be used to good visual effect.

Figure 5:
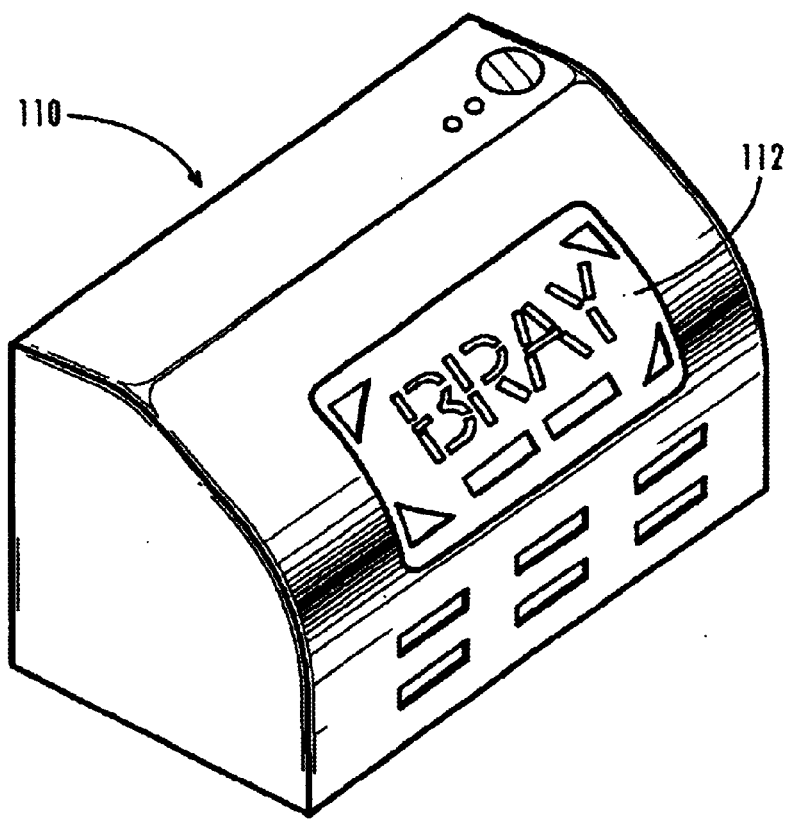
FIG. 5 shows a further embodiment of the burner according to the invention incorporated into a heater appliance.
Figure 6:
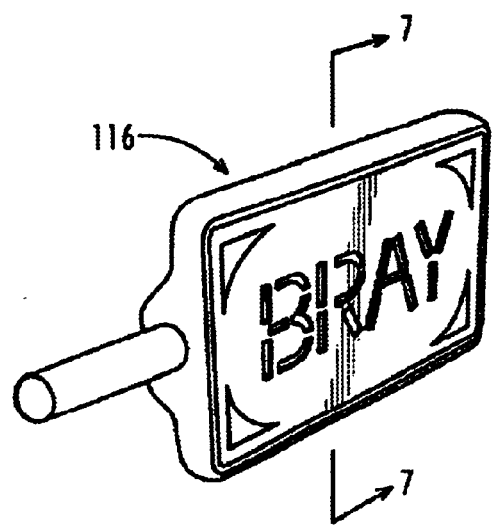
FIGS. 6-7 illustrate the burner in a form for use as grill type appliance.
Figure 7:
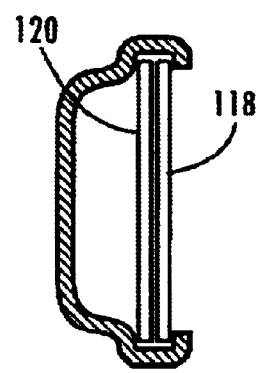

In FIG. 5 there is shown a heater appliance 110 in which there is incorporated a burner with a display panel 112 according to the invention, and in FIGS. 6 and 7 there is shown a perspective view and a side elevation respectively of a burner head 116 for use in a grill-type appliance. In FIG. 7, it can be seen that the burner head contains two separate sheets; 118 being heat treated and provided with a plurality of apertures as herein before described, and 120 being the gauze or mesh type material disposed immediately behind the sheet 118.

Figure 8:
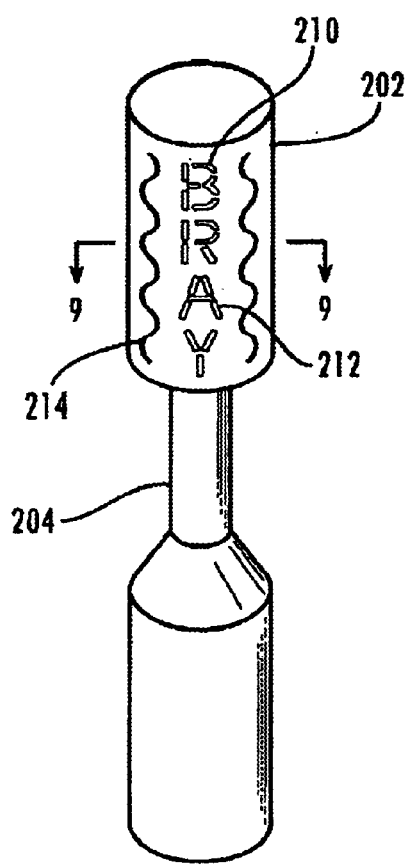
FIGS. 8-9 illustrate a further embodiment of the invention with the burner used as part of a patio heater appliance.
Figure 9:
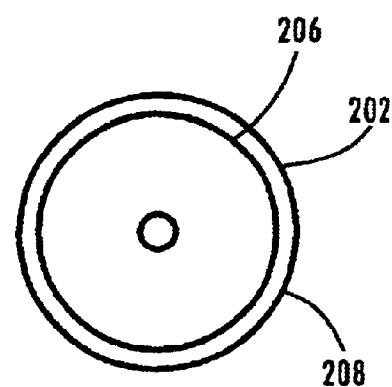

FIGS. 8 and 9 illustrate a yet further embodiment of the invention where the burner 202 is used in a different arrangement as part of a patio heater 204. In this case the burner 202 is cylindrical in form and, as is shown in FIG. 9 which is a sectional plan view along line A—A, the construction of the burner again includes an inner layer or layers of gauze or gauze like material 206 which incandesces when burning and a front or outer layer 208 with apertures 210 selectively spaced and shaped to in this case, provide the word 212 BRAY in alphanumeric characters and a logo 214.

In each case the visual appearance of the burner is significantly enhanced by the visual appearance of the red light through the selectively placed and formed apertures thereby providing an aesthetic appeal and also a significant commercial opportunity for the manufacturers of the burners, appliance or as an advertising opportunity and yet, by the selective placement the heating effect from the burner can also be enhanced.

What is claimed is:

1. A burner having a plenum chamber into which a source of combustible gas may be fed through an inlet thereof, said plenum chamber defining a cavity being a generally planar combustion surface of said burner, said combustion surface being formed firstly of a sheet of metal or other material capable of resisting heat provided with a plurality of apertures therein through which the combustible gas may pass to combust on or proximate the surface of said sheet of metal in the region of said apertures, and secondly of one or more sheets of permeable gauze-like material disposed immediately behind said sheet of metal or other material within the plenum chamber of said burner, said permeable gauze-like material incandescing in the presence of the heat or combustion and characterised in that the apertures within said sheet of metal or other material are arranged in a pattern which both ensures a generally uniform distribution of heat across the combustion surface during operation and which provides a visual display during operation by virtue of the incandescence of the permeable gauze like material viewable through the said apertures, wherein the sheet of metal is provided with a hardening coating which renders said combustion surface substantially black and the incandescence of the permeable gauze-like material being highlighted.

2. A burner according to claim 1 wherein the aperture is provided in a sheet of metal which forms the combustion surface are predominantly in the form of discreet slots to define alpha-numeric characters.

3. A burner according to claim 1 wherein the permeable gauze-like material is a metal gauze or mesh.

4. A burner according to claim 3 wherein the permeable gauze-like material is formed of at least two sheets of metal gauze, one sheet oriented perpendicular to the other as regards the warp and weft of the weave of the gauze.

5. A burner according to claim 1 wherein the sheet of metal combustion surface is heat treated to render it resistant to heat, said treatment resulting in a blackening of at least one surface of said sheet, said blackened surface being disposed outwardly of said burner so as to act as a combustion surface.

6. A burner according to claim 1 wherein the burner is provided as part of a cooking apparatus.

7. A burner according to claim 6 wherein the burner is provided in a head which is rotatable so as to reveal its combustion surface.

8. A burner according to claim 1 wherein the information message is in the form of alpha-numeric characters which consist of a plurality of separate apertures adjacently arranged in the shape of that particular alpha-numeric character.

9. A burner according to claim 1 and a cooking apparatus in which the burner is disposed.

10. A burner according to claim 1 and a heating apparatus in which the burner is disposed.

11. A burner comprising a plenum chamber into which a source of combustible gas is fed through an inlet thereof, said plenum chamber defining a cavity having a generally planar combustion surface of said burner, said combustion surface layered and formed of an outer layer of a sheet of a heat resistant material and an inner layer of sheet of permeable gauze or gauze-like material disposed behind said aperture sheet of metal within the plenum chamber of said burner, said permeable gauze-like material incandescing in the presence of the heat of combustion and said outer layer including a plurality of apertures to allow the combustible gas to pass therethrough and combust on or approximate the outer surface and characterised in that the apertures in said outer layer are arranged in a manner to define an alphanumeric character or definable design logo wherein the sheet of heat resistant material is provided with a hardening coating which renders said combustion surface substantially black and the incandescence of the permeable gauze-like material being highlighted.

12. A burner according to claim 11 wherein the apertures define a plurality of alphanumeric characters.

13. A burner according to claim 11 wherein the apertures define a design logo in the form of a trade mark.

14. A burner according to claim 11 wherein the outer surface of the outer layer is of a colour such that when the burner is alight, the colour of the incandescing inner layer is viewable through the apertures in the outer layer and contrasts with the colour of the outer surface of the outer layer.

15. A burner according to claim 11 wherein the burner can be oriented with respect to the remaining apparatus with which the same is provided to allow the outer surface and apertures thereon to be viewable in use.

16. A burner according to claim 15 wherein the burner is provided with a connection to the apparatus, the angular disposition of which can be adjusted in at least one axis.

17. A burner according to claim 11 and a cooking apparatus in which the burner is disposed.

18. A burner according to claim 11 and a heating apparatus in which the burner is disposed.

* * * * *